United States Patent Office 3,823,208
Patented July 9, 1974

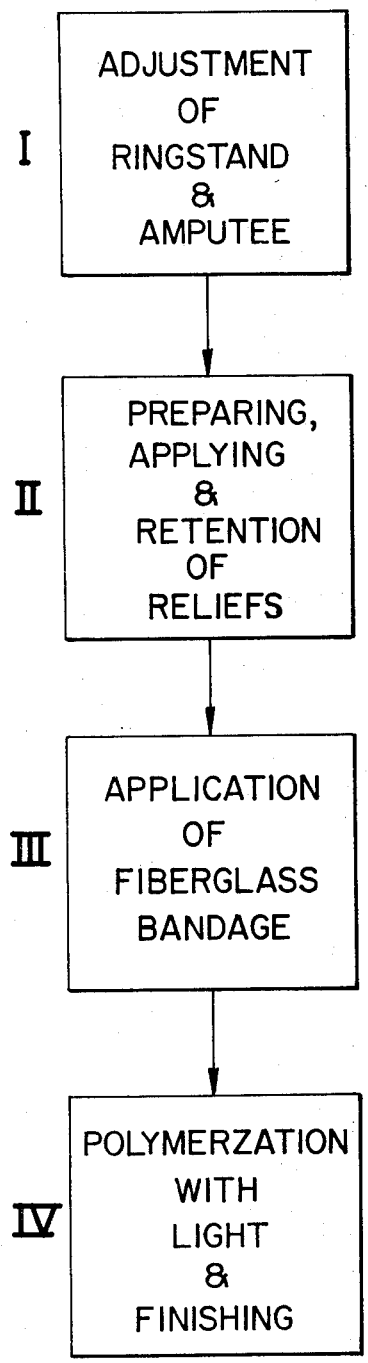
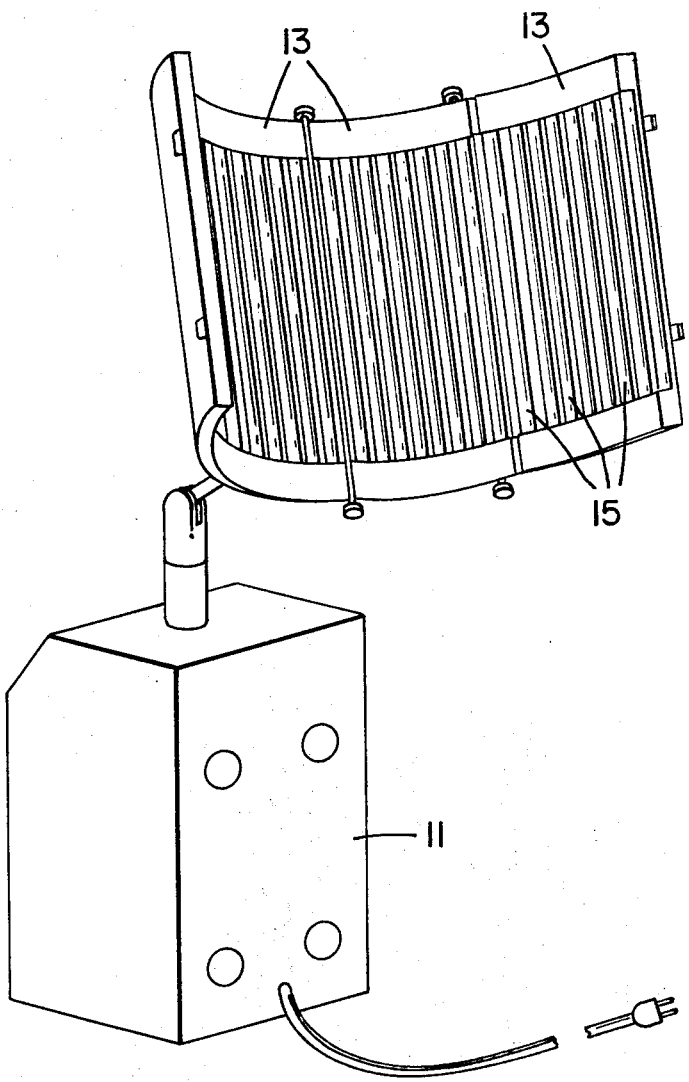
FIG_1
FIG_2

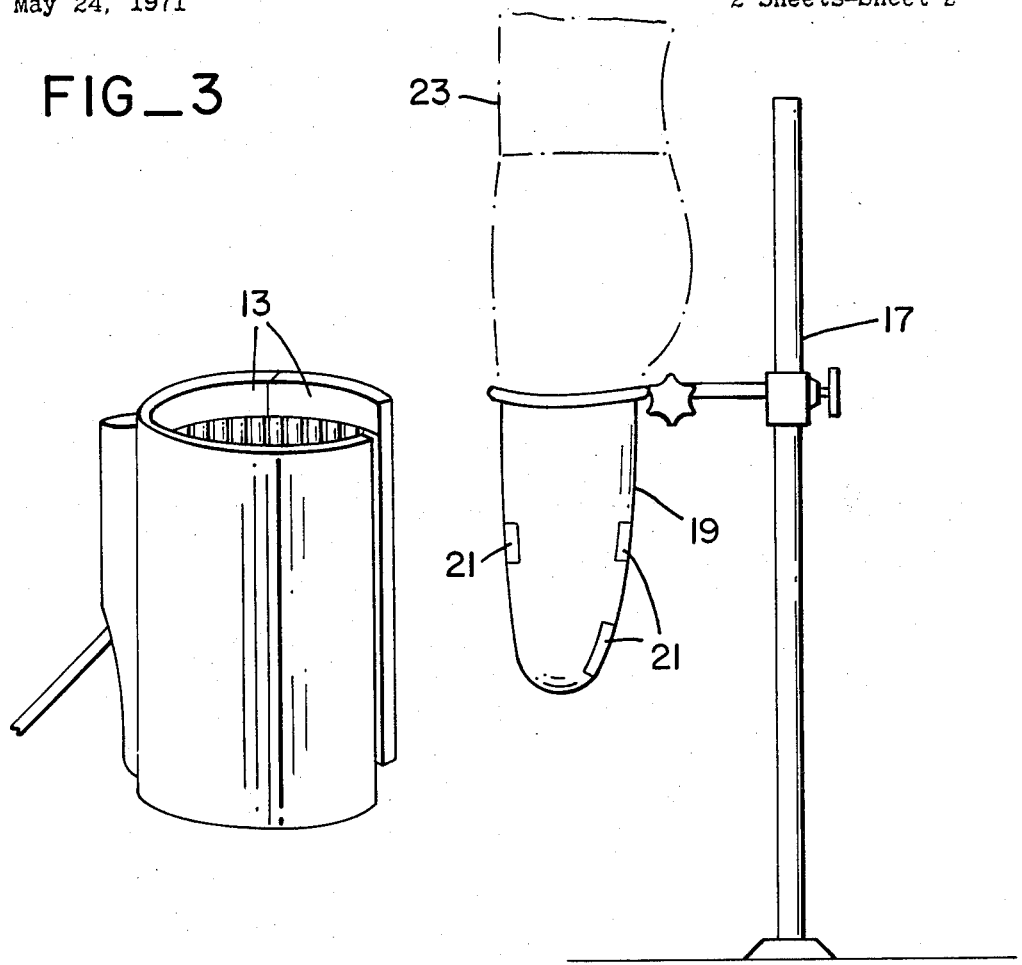
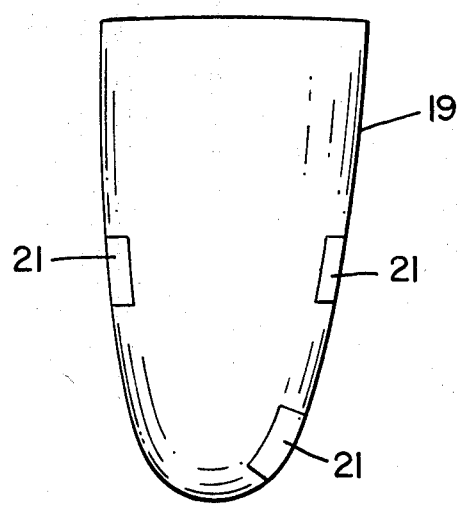

3,823,208
METHOD OF MAKING A PERMANENT PROSTHETIC SOCKET
Charles C. Asbelle, Oakland, Michael F. Arrigo, Berkeley, and Gerald K. Porter, Oakland, Calif., assignors to the United States of America as represented by the Secretary of the Navy
Filed May 24, 1971, Ser. No. 146,386
Int. Cl. B29g 7/00; A61f 1/08
U.S. Cl. 264—22          2 Claims

ABSTRACT OF THE DISCLOSURE

A method of making a permanent prosthetic socket wherein the amputee is supported by a casting fixture and ultraviolet polymerizable material are applied directly to the amputee's stump over a polypropylene stockinet to form a permanent socket. A special clam-shell ultraviolet lamp is placed in position and the ultraviolet polymerizable material polymerized.

BACKGROUND OF THE INVENTION

Field of the Invention

The invention relates generally to a method of making a prosthetic socket, and more particularly, to a method of making a porous laminated permanent prosthetic socket by using a ultraviolet polymerizable material and direct forming of the socket on an amputee's stump.

Description of the Prior Art

Prior methods required an intermediate step of making a model of the amputee's stump, usually made of plaster of Paris; because either the material became too hot to be in contact with the amputee's skin when it hardened, or else it was not easily modified after removal from the stump due to the hardening of the material, the method had limited success. Moreover, the hardened material would have limited porosity which would prevent air exchange between the stump and socket wall to the ambient air.

SUMMARY OF THE INVENTION

The unique method of the present invention will overcome the difficulties inherent in the old methods in that the polymerizing of the material is accomplished by ultraviolet irradiation which feature allows virtually unlimited time for manipulation of the material as compared with conventionally catalyzed plastics which have fixed reactions. Also, the temperatures reached during polymerization preclude the use of catalyzed resins in contact with the skin as contrasted with the absence of exothermic heat when the ultraviolet polymerizable material polymerizes. Moreover, this unique method can take advantage of the special properties of ultraviolet polymerizable material such as porosity which will allow the exchange of air through the socket wall which will allow more comfort to the amputee. It is also possible with this new method to block the ultraviolet light in selected areas and these areas may then be modified and then polymerized by exposure to the ultraviolet light.

STATEMENT OF THE OBJECTS OF INVENTION

A primary object of the present invention is to construct a permanent prosthetic socket so as to take advantage of the special properties of ultraviolet polymerizable materials or resins.

Another object of the present invention is to provide a unique method which will allow virtually unlimited time for manipulation of the prosthetic material.

Another object of the present invention is to provide a method which will allow direct forming of the socket on the amputation stump of an amputee.

Other objects, advantages, and novel features of the invention will become apparent from the following detailed description of the invention when considered in conjunction with the accompanying drawings.

FIG. 1 is a flow diagram representing the unique method of the present invention;

FIG. 2 is a sketch of special ultraviolet lamp;

FIG. 3 is a sketch showing the ultraviolet lamp and amputee attached to pre-polymerized socket through the ringstand; and FIG. 4 shows the completed socket.

DESCRIPTION OF THE PREFERRED EMBODIMENTS

Referring to FIGS. 2, 3, and 4 wherein the method requires the use of an ultraviolet polymerizable material, a polypropylene stockinette and an ultraviolet lamp 11. The source of ultraviolet light for polymerization for example may be a lamp produced by the "Lightcast" manufacturers. It is self-contained and comprises a battery of about sixty fluorescent tubes 15 arranged in a hinged circular system 13 which may be opened up like a clamshell. The lamp 11 is powered by an ordinary 110 V. AC current. The "clamshell" lamp 11 is adjustable for convenience and is placed about the ultraviolet polymerizable material to be polymerized. The ultraviolet light from the light system completes the already started polymerization proccess in the ultraviolet polymerizable material and after about eight minutes the applied ultraviolet polymerizable material becomes very hard. It should be noted that in this situation the sensation to the skin is one of gentle warmth with no discomfort such as excessive heat or any unusual sensation. When removed from the lamp 11, the ultraviolet polymerizable material casing or socket 19 is uniformly hardened. See FIG. 4. The surface is polyporomeric which will allow air to flow through the material to the dermis of the stump.

The unique method of the present invention illustrated in FIG. 1 comprises the following steps: pre-fitting of the amputee on a ring stand, Step I; preparing the reliefs which are applied to the stockinet covering; application of the reliefs; retention of the reliefs, Step II; application of the ultraviolet polymerizable material bandage, Step III; polymerization by ultraviolet light and final finishing, Step IV. The pre-fitting planning includes the use of a heavy ring stand 17 of the kind developed by Northwestern University, illustrated in FIG. 3. A thin cast stockinet sock is fitted and suspended to the amputation stump which is suspended by the ring. See FIG. 3. The fitted stockinet is reflected over the ring stand, adjusted to mid-thigh level, and then adjusted so that half of the body weight is borne on the stockinet by way of the amputation stump while the pelvis is level. Three felt reliefs are then applied at strategic points over the applied cotton. Oval sections are cut from the thin wool felt reliefs for application over the head of the fibula, its distal end. A larger strip of the same material is applied over the entire crest of the tibia. All edges of the three felt sections are skived to produce a tapered edge. They are each attached in their proper positions on the taut stockinet by first lightly spraying the back of the reliefs with cements such as Dow-Corning Medical Adhesive B and then cementing the two surfaces together. The polypropylene stockinet is made for use between the skin and ultraviolet polymerizable material. As the second section of stockinet is cut and sewn, it is pulled over the amputation stump to mid-thigh level where it is taped to the underlying cast sock, care being taken not to disturb the reliefs just applied.

An impregnated ultraviolet polymerizable material is applied from front to rear and from side to side to achieve maximum strength in the finished socket. The tape is applied firmly, but not tightly, in a series of spirals to avoid annular rings inside the socket tending to harmfully compress the underlying soft tissues. It should be noted that to properly form the fabric in the intrapatellar ligament and hamstring tendon areas, black plastic tape is placed over these areas 21 to prevent passage of the ultraviolet light on areas 21 thereby allowing the aforementioned areas to remain soft and pliable while the remainder or unprotected areas of the ultraviolet polymerizable material socket becomes hardened under the influence of the ultraviolet light. See FIG. 3. When the wrapping is completed, the socket will consist of two to three layers of ultraviolet polymerizable material.

Referring again to FIGS. 2, 3, 4, the ultraviolet lamp 11 is then placed in position around the socket 19 to achieve curing. The cylindrical loop device 13 opens like a clam shell to pass around the socket 19 for polymerization. This allows the uncured ultraviolet polymerizable material to be equidistant from the polymerizing effect of the light. The socket 19 is exposed for about eight minutes and then removed from the patient. The two taped light-protected areas 21 remain soft and pliable. These areas 21 are then molded by hand to the shape desired and the socket 19 alone is placed in the light for about eight minutes for a proper shelf for the intrapatellar ligament and flared reliefs for the hamstring tendons. The resulting socket is quite hard and stiff as well as being a poromeric ventilated structure.

The final step includes cutting and trimming and smoothing the upper brim edge of the socket 19 as well as aligning the socket. The proper alignment is achieved by using a standard UC-Berkeley Alignment Jig, well known in the art, which is attached through a wood disc by means of a rapid epoxy adhesive. The stump may be fitted with a standard attachment strap, also well known in the art. The socket may be covered with a suitable cosmetic material and attached to a lower shin portion.

By using the above method the amputee is walking on his functional leg, consisting of the unique ultraviolet polymerizable material stump socket attaching strap, the alignment fixture, and a molded foot (not shown) in less than one hour.

What is claimed is:

1. A method for making a permanent prosthetic socket for the stump of an amputee, said method comprising in combination the steps of:
   (a) mounting said stump in a stump mounting apparatus;
   (b) applying a porous stockinette covering over said stump;
   (c) applying a plurality of reliefs over said covering;
   (d) applying a porous covering over said relief;
   (e) applying a ultraviolet polymerizable material;
   (f) selectively covering specific areas of said polymerizable material with a material which prevents the covered areas from being polymerized;
   (g) surrounding said polymerizable material with an ultraviolet lamp comprised of a clam-shell shaped enclosure having a plurality of ultraviolet lights circumferentially arranged to encompass and surround the polymerizable covering;
   (h) operating said ultraviolet lamp until said polymerizable covering is polymerized to form a porous laminated socket;
   (i) removing said socket from said stump;
   (j) removing said material which prevents polymerization from said specific areas;
   (k) molding said specific areas to modify the load distribution at said specific areas;
   (l) polymerizing said specific areas; and
   (m) trimming and smoothing the upper edges of said socket.

2. The method recited in claim 1 wherein said material is applied in the intrapatellar ligament and hamstring areas of a covered amputation stump wherein said material prevents polymerization of said areas of the stump.

References Cited

UNITED STATES PATENTS

| 2,947,307 | 8/1960 | Hoppe | 128—90 |
| 3,613,675 | 10/1971 | Larsen | 128—90 |
| 2,825,282 | 3/1958 | Gergen et al. | 264—52 X |
| 2,480,749 | 8/1949 | Marks | 264—22 |
| 3,421,501 | 1/1969 | Beightol | 128—90 |

FOREIGN PATENTS

| 636,379 | 4/1950 | Great Britain | 204—22 |

OTHER REFERENCES

Zettl et al., "The Interface in Immediate Post-Surgical Prosthesis," Orthotics and Prosthetics, March 1970, pp. 1–6 relied on.

Hampton, Fred, "No Suspension Casting Technique," Bull. of Prosthetics Research, Dept. of Medicine and Surgery, Wash. D.C., BPR. 10–6, Fall 1966, p. 52–65 relied on.

ROBERT F. WHITE, Primary Examiner

W. E. HOAG, Assistant Examiner

U.S. Cl. X.R.

264—222, 250, 257